(No Model.)

D. M. CULVER.
CHECK ROW CORN PLANTER.

No. 317,441. Patented May 5, 1885.

WITNESSES:
Chas. Nida.
C. Sedgwick.

INVENTOR:
D. M. Culver
BY
ATTORNEYS.

UNITED STATES PATENT OFFICE.

DARIUS MANSFIELD CULVER, OF TIPTON, IOWA, ASSIGNOR OF ONE-HALF TO REUBEN OWEN, OF SAME PLACE.

CHECK-ROW CORN-PLANTER.

SPECIFICATION forming part of Letters Patent No. 317,441, dated May 5, 1885.

Application filed November 15, 1884. (No model.)

*To all whom it may concern:*

Be it known that I, DARIUS MANSFIELD CULVER, of Tipton, in the county of Cedar and State of Iowa, have invented a new and useful Improvement in Check-Row Corn-Planters, of which the following is a full, clear, and exact description.

Reference is to be had to the accompanying drawings, forming a part of this specification, in which similar letters of reference indicate corresponding parts in both the figures.

Figure 1:
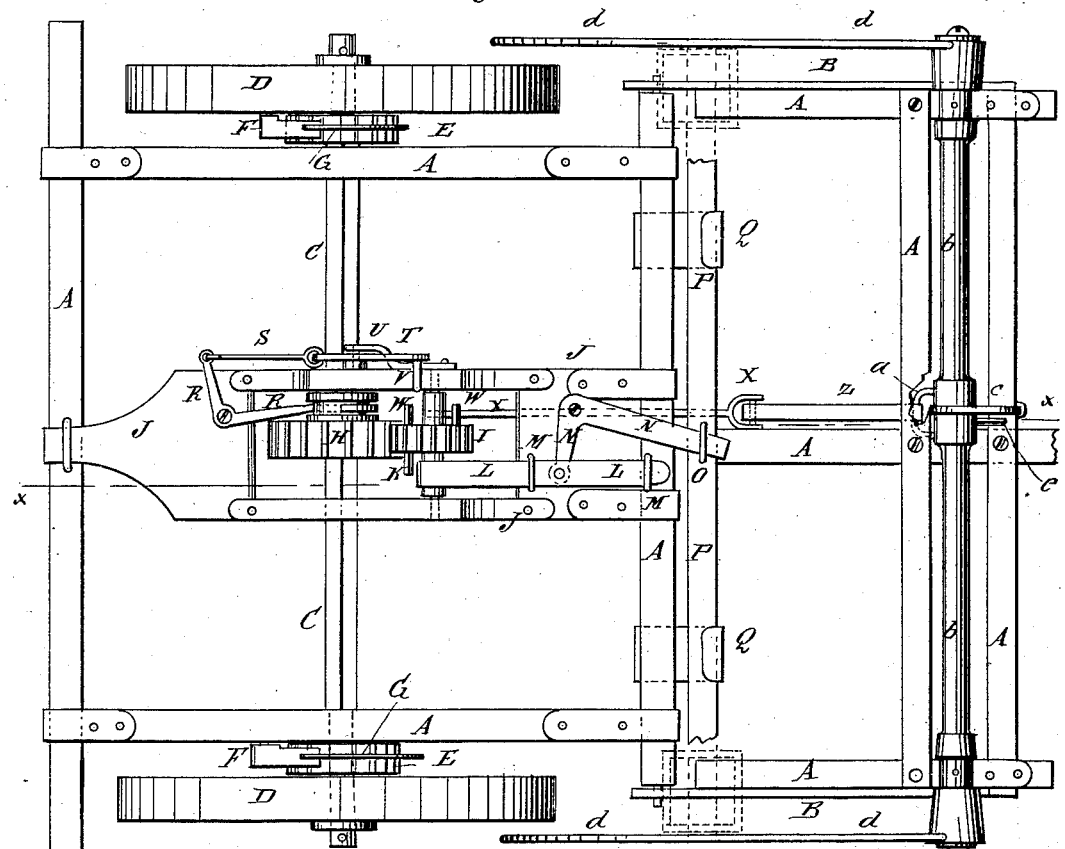
Figure 2:
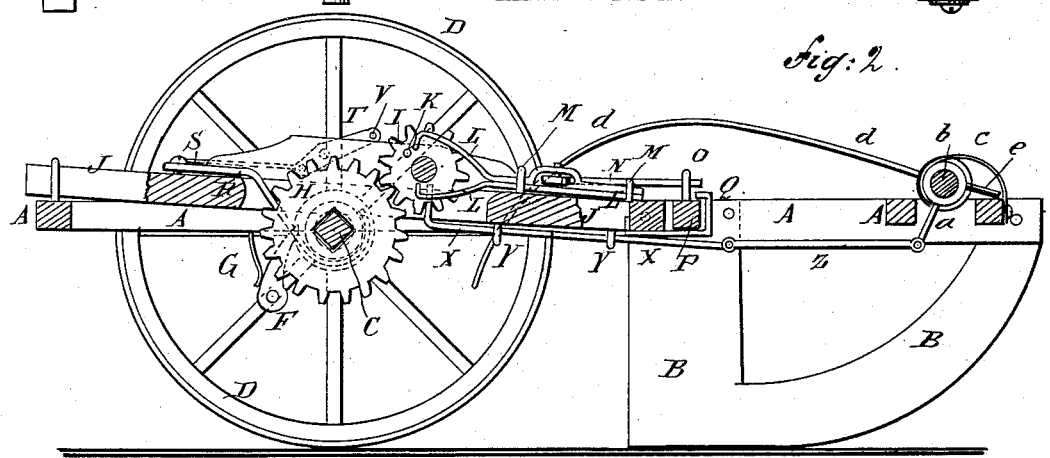

Figure 1 is a plan view of one of my improved check-row corn-planters. Fig. 2 is a sectional side elevation of the same, taken through the broken line $xx$, Fig. 1.

The object of this invention is to facilitate the planting of corn in accurate check-row, and to promote convenience in controlling check-row corn-planters.

The invention consists in the construction and arrangement of parts, as will be hereinafter fully described and specifically claimed.

A represents the frame of the machine, to the forward part of which are attached runners B, to open channels to receive the seed. In bearings attached to the rear part of the frame A revolves the axle C of the drive-wheels D.

To the axle C are attached ratchet-wheels E, with the teeth of which engage pawls F, pivoted to the wheels D, and held in gear with the said ratchet-wheels E by springs G, attached to the said drive-wheels D, and resting upon the said pawls, so that the said drive-wheels will carry the said axle with them in their forward revolution, but can be turned back without turning the said axle. The middle part of the axle C is made square, and upon it is placed a gear-wheel, H, having a square bore, so that the said gear-wheel can slide longitudinally upon the said axle, but will be carried around with it in its revolution. The teeth of the gear-wheel H mesh into the teeth of a smaller gear-wheel, I, journaled to a frame, J, the forward and rear ends of which are attached to cross-bars of the main frame A.

To one side of the gear-wheel I is attached a pin, K, which, as the said gear wheel I revolves, engages with the lower branch of the forked rear end of the bar L, and pushes the said bar forward, and then engages with the upper branch of the said forked rear end and draws the said bar rearward, the said ends being bent or flanged, so that the said pin will engage with them with certainty.

The bar L slides in keepers M, attached to the frame J, and to its middle part is pivoted the end of the short arm of the elbow-lever N, which is pivoted at its angle to the said frame J. The long arm of the elbow-lever N passes through a keeper, O, attached to the seed-dropping slide P, so that the said slide will be operated to drop the seed by the forward revolution of the drive-wheels D. The slide P works in bearings Q, attached to a cross-bar of the frame A.

One end of the hub of the gear-wheel H projects and has an annular groove formed in it, to receive the hooked or forked end of the elbow-lever R, which is pivoted at its angle to the frame J. To the other end of the elbow-lever R is pivoted the end of a short connecting-rod, S. The other end of the rod S is pivoted to the lower end of a lever, T, which is pivoted at its middle part to the side of the frame J, and to a bracket, U, attached to the said side.

To the upper end of the lever T is attached a pin, V, which projects so as to serve as a handle for convenience in operating the said lever, and as a stop to come in contact with the top of the frame J, and thus limit the movement of the said lever. With this construction, by moving the upper end of the lever T to the rearward, the gear-wheel H will be thrown out of gear with the gear-wheel I, and by moving the said upper end forward the said gear-wheels will be thrown into gear.

To the other side of the gear-wheel I from the pin K are attached two pins, W, which engage successively with the upwardly-bent rear end of the rod X, which slides in keepers Y, attached to the frame J, and is jointed at its forward end to the rear end of the rod or bar Z. The forward end of the rod or bar Z is pivoted to a downwardly-projecting arm, $a$, formed upon or attached to the middle part of the shaft $b$, which rocks in bearings attached to the frame A. To the shaft $b$ is attached the inner end of a spring, $c$, which is coiled around the said shaft, and its outer end is attached to a cross-bar of the frame C in such a manner as to turn the shaft $b$ back when it has been rocked in one direction by the forward movement of the jointed rod X Z.

The ends of the rock-shaft $b$ project, and to them are attached the forward ends of the rods $d$, which project rearward and upward, and their rear ends are curved downward, as shown in Fig. 2, so that at each forward movement of the jointed rod X Z the rear ends of the bent rods $d$ will be swung downward, bringing their said rear ends into contact with the ground, the pins W being attached to the gear-wheel I in such position that the marks made by the rods $d$ will be exactly in line with the cross-rows, so as to serve as guides to the driver in keeping the said cross-rows straight.

The shaft $b$ is kept from being turned too far by the action of the spring $c$ by a stop-pin, $e$, attached to the said shaft, and which comes in contact with a cross-bar of the frame A, as shown in Figs. 1 and 2.

Having thus described my invention, I claim as new and desire to secure by Letters Patent—

1. In a check-row corn-planter, the frame A, axle C, drive-wheels D, the gear-wheel H, and a lever for sliding it, the frame J, the seed-slide, P, the gear-wheel I, journaled on frame J, to mesh with the gear H, and the pins K W on the opposite sides of said gear I, the forked bar L, having the ends of its fork bent inward to engage pin K, lever N, connecting slide L with the seed-slide, the spring-operated rock-shaft $b$, journaled in front of the seed-slide and having the marker-arms $d$, the sliding rod X, connected to the rock-shaft at its forward end, and bent at its rear end to engage pins W, substantially as set forth.

2. In a check-row corn-planter, the combination of the frames A J, wheels D, axle C, gear-wheels H I, a lever for throwing said gears into and out of engagement, pins W on the face of the gear I, the rod X, bent at its rear end to extend into the path of the pins W, the rock-shaft $b$, having the marker-arms $d$, the spring $e$, secured to the frame and to the rock-shaft for raising the arms $d$, the arm $a$, projecting from the rock-shaft, and connected to the rod X, substantially as set forth.

DARIUS MANSFIELD CULVER.

Witnesses:
CHAS. SWARTZLANDER,
H. C. CARR.